United States Patent [19]
Vanmaele et al.

[11] Patent Number: 5,397,762
[45] Date of Patent: Mar. 14, 1995

[54] DYE-DONOR ELEMENT COMPRISING TRICYANOVINYLANILINE DYES

[75] Inventors: Luc Vanmaele, Lochristi; Wilhelmus Janssens, Aarschot, both of Belgium

[73] Assignee: AGFA-Gevaert, N.V., Mortsel, Belgium

[21] Appl. No.: 152,742

[22] Filed: Nov. 16, 1993

[30] Foreign Application Priority Data

Nov. 19, 1992 [EP] European Pat. Off. ............ 92203567

[51] Int. Cl.$^6$ ...................... B41M 5/035; B41M 5/38
[52] U.S. Cl. .................... 503/227; 428/195; 428/480; 428/913; 428/914
[58] Field of Search .................. 8/471; 428/195, 480, 428/913, 914; 503/227

[56] References Cited

U.S. PATENT DOCUMENTS 5,041,412 8/1991 Chapman et al. .................. 503/227

*Primary Examiner*—B. Hamilton Hess
*Attorney, Agent, or Firm*—Breiner & Breiner

[57] ABSTRACT

Dye-donor element for use according to thermal dye transfer methods, said element comprising a dye layer comprising at least one dicyanovinylaniline dye, wherein the amino group of the aniline function of said dye carries an aryl group not being substituted with a dicyanovinyl group and a hydrocarbon or substituted hydrocarbon group linked by a secondary carbon atom to said amino group. The dyes have very good light-fastness and good spectral absorption characteristics.

7 Claims, No Drawings

DYE-DONOR ELEMENT COMPRISING TRICYANOVINYLANILINE DYES

DESCRIPTION

1. Field of the Invention

The present invention relates to novel yellow N-aryl-N-alkyl-substituted dicyanovinylaniline dyes and to dye-donor elements comprising such dyes for use according to thermal dye transfer methods.

2. Background of the Invention

Thermal dye transfer methods include thermal dye sublimation transfer also called thermal dye diffusion transfer. This is a recording method in which a dye-donor element provided with a dye layer containing sublimating dyes having heat transferability is brought into contact with a receiver sheet and selectively, in accordance with a pattern information signal, heated with a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side of the support is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

Many of the dyes proposed for use in thermal dye sublimation transfer are not sufficient in performance since they yield inadequate transfer densities at reasonable coating coverages, or because they have inadequate spectral characteristics for substractive colour systems, or poor light-fastness.

Yellow dyes of the dicyanovinylaniline dye class have been described in U.S. Pat. No. 4,833,123 and in EP 271 861. Yellow dyes of the tricyanovinylaniline dye class have also been described for use in thermal transfer recording in JP 84/78 895.

U.S. Pat. No. 3,189,641 discloses yellow dicyanovinylaniline dyes that contain a dicyanovinyl group substituted aryl group on the aniline nitrogen for dying textiles.

In this class of dyes the N,N-dialkyl-substituted compounds have good spectral absorption characteristics but unfortunately a poor light-fastness.

SUMMARY OF THE INVENTION

It is an object of the present invention to provide novel yellow N-aryl-N-alkyl-substituted dicyanovinylaniline dyes that combine good light-fastness with good spectral absorption characteristics.

It is another object of the present invention to provide novel yellow N-aryl-N-alkyl-substituted dicyanovinylaniline dyes that can be used in thermal dye sublimation transfer printing.

Further objects will become apparent from the description hereinafter.

According to the present invention dicyanovinylaniline dyes have been found, in which dyes the amino group of the aniline function carries an aryl group not being substituted with a dicyanovinyl group and a hydrocarbon or substituted hydrocarbon group linked by a secondary carbon atom to said amino group.

Preferred dicyanovinylaniline dyes according to the present invention correspond to the general formula (I):

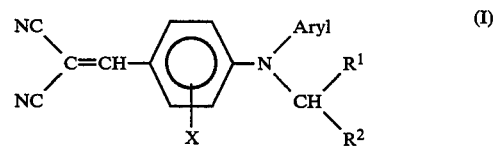

wherein:

X represents hydrogen or a substituent,

Aryl represents a phenyl group or a substituted phenyl group except a phenyl group substituted with a dicyanovinyl group, and $R^1$ and $R^2$ (same or different) represent an alkyl group, a substituted alkyl group, an aralkyl group, a substituted aralkyl group, a cycloalkyl group, a substituted cycloalkyl group, an alkenyl group, a substituted alkenyl group, an arylalkenyl group, a substituted arylalkenyl group, an aryl group, a substituted aryl group, or $R^1$ and $R^2$ together complete a 5- or 6-membered cycloalkyl group or substituted cycloalkyl group, or $R^1$ and $R^2$ together complete a 5- or 6-membered heterocyclic ring or substituted heterocyclic ring.

The present invention also provides a dye-donor element for use according to thermal dye transfer methods, said element comprising a support having thereon a dye layer comprising a binder and at least one dicyanovinylaniline dye, wherein the amino group of the aniline function of said dye carries an aryl group not being substituted with a dicyanovinyl group and a hydrocarbon or substituted hydrocarbon group linked by a secondary carbon atom to said amino group.

The present invention further also provides a dye-donor element for use according to thermal dye transfer methods, said element comprising a support having thereon a dye layer comprising a binder and at least one dicyanovinylaniline dye, wherein said dye corresponds to the above general formula (I).

Furthermore, the present invention also provides a method of image-wise heating a dye-donor element comprising a support having thereon a dye layer comprising a binder and at least one dicyanovinylaniline dye, the amino group of the aniline function of said dye carrying an aryl group not being substituted with a dicyanovinyl group and a hydrocarbon or substituted hydrocarbon group linked by a secondary carbon atom to said amino group, and causing transfer of the image-wise heated dye to a receiver sheet.

DETAILED DESCRIPTION OF THE INVENTION

The dyes of the invention corresponding to the general formula (I) can be prepared according to established synthetic procedures known e.g. from The Chemistry and Application of Dyes, Edited by D. R. Waring and G. Hallas, Plenum Press, 1990, pages 119–128.

Compounds within the scope of the present invention and corresponding to the general formula (II) include the following listed in Table 1:

TABLE 1

(II)

$(NC)_2C=CH-C_6H_3(X)-N(R)(C_6H_4 R')$

| Compound no. | X | R | R' |
|---|---|---|---|
| D1 | H | $H_3C\text{-}CH\text{-}C_2H_5$ | H |
| D2 | H | $C_6H_5\text{-}$ | H |
| D3 | H | $H_3C\text{-}CH\text{-}C_2H_5$ | $4\text{-}CH_3OC_2H_4O-$ |
| D4 | H | $H_3C\text{-}CH\text{-}C_2H_5$ | $4\text{-}H_5C_2-$ |
| D5 | H | $C_6H_5\text{-}$ | $4\text{-}CH_3O-$ |
| D6 | H | $C_6H_5\text{-}$ | $4\text{-}CH_3OC_2H_4O-$ |
| D7 | H | $H_3C\text{-}CH\text{-}C_2H_5$ | $4\text{-}CH_3O-$ |

It has been established that the dicyanovinylaniline dyes of the present invention—unlike the known dicyanovinylaniline dyes—have a very good light-fastness and good spectral absorption characteristics when used in a thermal transfer process, which is apparently due to the combined presence on the amine group of the aniline function of an aryl group and a hydrocarbon group, a secondary carbon atom of which is attached to said same amine group.

According to a preferred embodiment of the present invention these dyes are used as yellow dyes in the dye layer of a dye-donor element for thermal dye sublimation transfer.

The dye layer of the dye-donor element is formed preferably by adding the dyes, a polymeric binder medium, and other optional components to a suitable solvent or solvent mixture, dissolving or dispersing these ingredients to form a coating composition that is applied to a support, which may have been provided first with an adhesive or subbing layer, and dried.

The dye layer thus formed generally has a thickness of about 0.2 to 5.0 $\mu$m, preferably 0.4 to 2.0 $\mu$m, and the amount ratio of dye to binder generally ranges from 9:1 to 1:3 weight, preferably from 3:1 to 1:2 by weight.

The following polymers can be used as polymeric binder: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phtalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide, polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes, epoxy resins and natural resins, such as gum arabic. Preferably, the binder for the dye layer of the present invention comprises cellulose acetate butyrate or copolystyrene-acrylonitrile.

The dye-donor element of the present invention can be used for the recording of a coloured image together with primary colour dye-donor elements comprising respectively a magenta dye or a mixture of magenta dyes, a cyan dye or a mixture of cyan dyes and a yellow dye or a mixture of yellow dyes.

Any dye can be used in such a primary colour dye layer provided it is easily transferable to the dye-image-receiving layer of the receiver sheet by the action of heat.

The dyes of the present invention can be used alone or mixed with one another, or even mixed with other primary colour dyes.

Typical and specific examples Of other primary colour dyes for use in thermal dye sublimation transfer have been described in e.g. EP 400,706, EP 209,990, EP 216,483, EP 227,095, EP 227,096, EP 229,374, EP 235,939, EP 247,737, EP 257,577, EP 257,580, EP 258,856, EP 279,330, EP 279,467, EP 285,665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/268,493, JP 86/268,494, JP 85/268,495, and JP 86/284,489.

The coating layer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive of subbing layer, if desired.

The dye layer of the dye-donor element can be coated on the support or printed thereon by a printing technique such as a gravure process.

A dye-barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye-barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in th art such as carboxylates, sulfonates, phosphates, aliphatic amine salts, aliphatic quaternary ammonium salts, polyethylene alkyl ethers, polyethylene glycol fatty acid esters, fluoroalkyl C—C aliphatic acids. Examples of liquid lubricants include silicone oils, synthetic oils, saturated hydrocarbons, and glucols. Examples of solid lubricants include various higher alcohols such as stearyl alcohol, fatty acids and fatty acid exters. Suitable slipping layers have been described in e.g. EP 138,483, EP 227,090, U.S. Pat. No. 4,567,113, U.S. Pat. No. 4,572,860, U.S. Pat. No. 4,717,711. Preferably the slipping layers comprises a styrene-acrylonitrile copolymer or a styrene-acrylonitrile-butadiene copolymer or a mixture thereof or a polycarbonate as described in European Patent Application no. 91202071.6, as binder and a polysiloxane-polyether copolymer or polytetrafluoroethylene or a mixture thereof as lubricant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet this support must be coated with a special layer called dye-image-receiving layer, into which the dye can diffuse more readily. The dye-image-receiving layer may comprise e.g. a polycarbonate, a polyurethane, a polyester, a polyamide, polyvinyl chloride, polystyrene-co-arcylonitrile, polycaprolactone, or mixtures thereof. The dye-image receiving layer may also comprise a heat-cured product of poly(vinyl chloride/co-vinyl acetate/co-vinyl alcohol) and polyisocyanate. Suitable dye-image-receiving layers have been described in e.g. EP 133,011, EP 133,012, EP 144,247, EP 227,094, and EP 228,066.

In order to improve the light-fastness and other stabilities of recorded images UV-absorbers, singlet oxygen quenchers such as HALS-compounds (Hindered Amine Light Stabilizers) and/or antioxidants can be incorporated into the dye-image-receiving layer.

The dye layer of the dye-donor element or the dye-image-receiving layer of the receiver sheet may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-to-face relation with the dye-image-receiving layer of the receiver sheet and image-wise heating from the back of the dye-donor element. The transfer of the dye is accomplished by heating for about several milliseconds at a temperature of 400° C.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the dye-receiving element and the process is repeated. The third colour and optionally, further colours are obtained in the same manner.

In addition to thermal heads, laser light, infrared flash, or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon consisting of e.g. a multilayer structure of a carbon-loaded polycarbonate coated with a thin aluminium film. Current is injected into the resistive ribbon by electrically addressing a printing head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology as compared to the thermal head technology, according to which the various elements of the thermal head get hot and must cool down before the head can move to the next printing position.

The following example illustrates the invention in more detail without, however, limiting the scope thereof.

EXAMPLE

Receiver sheets were prepared by coating a subbed polyethylene terephthalate film support having a thickness of 175 μm with a dye-image-receiving layer from a solution in ethyl methyl ketone of 3,6 g/m² of poly(vinyl chloride/co-vinyl acetate/co-vinyl alcohol) (Vinylite VAGD supplied by Union Carbide), 0,336 g/m² of diisocyanate (Desmodur N3300 supplied by Bayer AG), and 0,2 g/m² of hydroxy-modified polydimethylsiloxane (Tegomer H SI 2111 supplied by Goldschmidt).

Dye-donor elements for use according to thermal dye sublimation transfer were prepared as follows.

A solution comprising 0,5% by weight of dye and 0,5% by weight of of poly(styrene-co-acrylonitrile) (Luran 388S, supplied by BASF Germany) as binder in methyl ethyl ketone was prepared.

From this solution a dye layer having a wet thickness of 100 μm was coated on a polyethylene terephthalate film support having a thickness of 6 μm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a a solution in methyl ethyl ketone of 0.5 g/m² of a polycarbonate having the following structural formula to form a heat-resistant layer:

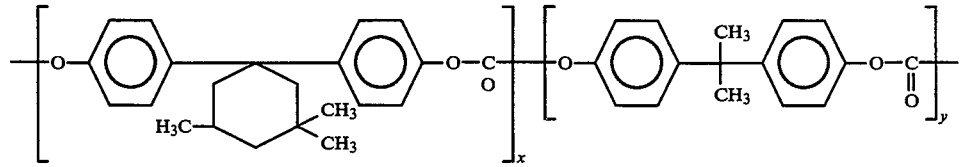

wherein x=55 mol % and y=45 mol %.

Finally, a top layer of polyether-modified polydimethylsiloxane (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The receiver sheet was separated from the dye-donor element and the colour density value of the recorded image was measured by means of a Macbeth TR 924 densitometer in the red, green, and blue region in Status A mode.

The above described experiment was repeated for each of the dyes identified in the Tables 2 and 3 hereinafter.

Finally, each receiver sheet was subjected to irradiation by means of a xenon lamp of 150 klux for a time indicated in hours in Table 3. The colour density values were measured again and the density loss or gain (in %) was calculated and listed in Table 3.

In Table 2 the structure of known colour dicyanovinylaniline dyes used as comparison examples is given. These comparison dyes correspond to general formula (II), X being hydrogen.

TABLE 2

| Compound no. | R | R' |
|---|---|---|
| C1 | $H_9C_4-$ | H |
| C2 | $H_5C_2$\<br>　　＼<br>　　　CH—CH₂—<br>　　／<br>$H_9C_4$ | H |
| C3 | $H_3COC_2H_4-$ | H |
| C4 | $H_3COC_2H_4OC_2H_4-$ | H |
| C5 | $H_9C_4-$ | $4\text{-}CH_3OC_2H_4O-$ |
| C6 | $H_9C_4-$ | $4\text{-}CH_3O-$ |
| C7 | $CH_3OC_2H_4OC_2H_4-$ | $4\text{-}CH_3O-$ |
| C8 | $CH_3OC_2H_4-$ | $4\text{-}CH_3O-$ |
| C9 | ⌬—$OC_2H_4-$ | $4\text{-}CH_3O-$ |
| C10 | $H_5C_2$\<br>　　＼<br>　　　CH—CH₂—<br>　　／<br>$H_9C_4$ | $4\text{-}CH_3O-$ |
| C11 | $H_9C_4-$ | $4\text{-}H_5C_2-$ |
| C12 | $CH_3OC_2H_4-$ | $4\text{-}H_5C_2-$ |
| C13 | $CH_3OC_2H_4OC_2H_4-$ | $4\text{-}H_5C_2-$ |
| C14 | ⌬—$OC_2H_4-$ | $4\text{-}H_5C_2-$ |
| C15 | $H_5C_2$\<br>　　＼<br>　　　CH—CH₂—<br>　　／<br>$H_9C_4$ | $4\text{-}H_5C_2-$ |

From the following Table 3 the light-fastness of the comparison dyes C01 to C15 and of the dyes D01 to D07 according to the invention can be derived. The values measured for maximum density (Dmax) and spectral absorption are listed as well in Table 3.

TABLE 3

| Compound no. | Density loss in % after xenon exposure for | | | Dmax | Status A | | |
|---|---|---|---|---|---|---|---|
| | 4 h | 12 h | 28 h | | Red | Green | Blue |
| INVENTION | | | | | | | |
| D1 | −01 | −20 | −65 | 222 | 12 | 16 | 150 |
| D2 | −02 | −34 | −77 | 192 | 10 | 14 | 150 |
| COMPARISON | | | | | | | |
| C1 | −08 | −68 | −93 | 266 | 10 | 15 | 160 |
| C2 | −22 | −74 | −90 | 245 | 11 | 15 | 150 |
| C3 | −23 | −67 | −90 | 239 | 10 | 14 | 150 |
| C4 | −22 | −69 | −92 | 236 | 10 | 14 | 150 |
| INVENTION | | | | | | | |
| D4 | −07 | −40 | −86 | 201 | 10 | 13 | 150 |
| COMPARISON | | | | | | | |
| C16 | −24 | −77 | −94 | 228 | 10 | 15 | 150 |
| C15 | −12 | −51 | −88 | 194 | 10 | 14 | 150 |
| C14 | −17 | −63 | −91 | 228 | 10 | 14 | 150 |
| C13 | −12 | −61 | −91 | 241 | 10 | 14 | 150 |
| C12 | −26 | −75 | −94 | 181 | 10 | 15 | 147 |
| INVENTION | | | | | | | |
| D5 | −03 | −26 | −67 | 177 | 10 | 14 | 150 |
| D7 | −04 | −13 | −50 | 203 | 11 | 16 | 150 |
| COMPARISON | | | | | | | |
| C6 | −03 | −36 | −85 | 236 | 11 | 16 | 150 |
| C7 | −07 | −41 | −83 | 207 | 10 | 15 | 150 |
| C8 | −05 | −36 | −81 | 209 | 10 | 15 | 150 |
| C10 | −02 | −37 | −80 | 177 | 10 | 14 | 150 |
| C11 | −10 | −61 | −91 | 204 | 10 | 15 | 150 |
| INVENTION | | | | | | | |
| D3 | −02 | −32 | −75 | 198 | 10 | 14 | 150 |
| D6 | −01 | −21 | −58 | 159 | 11 | 14 | 150 |
| COMPARISON | | | | | | | |
| C5 | −04 | −33 | −84 | 232 | 11 | 16 | 150 |

It is demonstrated by the results listed in Table 3 that the comparison dyes C01 to C15 with prior art N-aryl-N-alkyl-substitution, which do not have a secondary carbon atom linked to the amino group of the aniline, have a poor light-fastness.

In contrast, the N-aryl-N-alkyl-substituted dyes D01 to D07 according to the invention, which do have a secondary carbon atom linked to the amino group of the aniline, have a very good light-fastness.

I claim:

1. Dye-donor element for use according to thermal dye transfer methods, said element comprising a support having thereon a dye layer comprising a binder and at least one dicyanovinylaniline dye, wherein the amino group of the aniline function of said dye carries an aryl group not being substituted with a dicyanovinyl group and a hydrocarbon or substituted hydrocarbon group linked by a secondary carbon atom to said amino group.

2. A dye-donor element according to claim 1, wherein said dye corresponds to the following general formula (I):

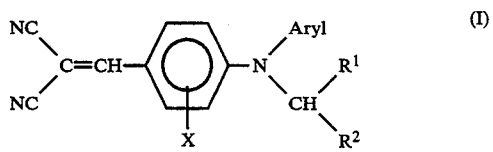

wherein:
X represents hydrogen or a substituent,
Aryl represents a phenyl group or a substituted phenyl group, except a phenyl group substituted with a dicyanovinyl group,
$R^1$ and $R^2$ independently represent an alkyl group, a substituted alkyl group, an aralkyl group, a substituted aralkyl group, a cycloalkyl group, a substituted cycloalkyl group, an alkenyl group, a substituted alkenyl group, an arylalkenyl group, a substituted arylalkenyl group, an aryl group, a substituted aryl group, or $R^1$ and $R^2$ together complete a 5- or 6-membered cycloalkyl group or substituted cycloalkyl group, or $R^1$ and $R^2$ together complete a 5- or 6-membered heterocyclic ring or substituted heterocyclic ring.

3. A dye-donor element according to claim 1 or 2, wherein said binder comprises cellulose acetate butyrate or copolystyreneacrylonitrile.

4. A dye-donor element according to claim 1, wherein the reverse side of said dye-donor element has been coated with a slipping layer comprising a lubricating material.

5. A dye-donor element according to claim 1, wherein a dye-barrier layer comprising a hydrophilic polymer is provided between said support and said dye layer.

6. A dye-donor element according to claim 1, wherein said support comprises polyethylene terephthalate.

7. Method of image-wise heating a dye-donor element comprising a support having thereon a dye layer comprising a binder and at least one dicyanovinylaniline dye, the amino group of the aniline function of said dye carrying an aryl group not being substituted with a dicyanovinyl group and a hydrocarbon or substituted hydrocarbon group linked by a secondary carbon atom to said amino group, and causing transfer of the dicyanovinylaniline dye to a receiver sheet.

* * * * *